United States Patent
Park et al.

(10) Patent No.: US 7,454,109 B2
(45) Date of Patent: Nov. 18, 2008

(54) OPTICAL FIBER WITH ZERO DISPERSION WAVELENGTH SHIFTED TO SHORT WAVELENGTH REGION, AND OPTICAL TRANSMISSION LINE AND OPTICAL TRANSMISSION SYSTEM USING THE SAME

(75) Inventors: Hye-Young Park, Seoul (KR); Jun-Ho Mun, Gyeonggi-do (KR)

(73) Assignee: LS Cable, Ltd., Seoul (KR)

( * ) Notice: Subject to any disclaimer, the term of this patent is extended or adjusted under 35 U.S.C. 154(b) by 0 days.

(21) Appl. No.: 11/631,553

(22) PCT Filed: Jul. 13, 2004

(86) PCT No.: PCT/KR2004/001739

§ 371 (c)(1),
(2), (4) Date: Jan. 3, 2007

(87) PCT Pub. No.: WO2006/006749

PCT Pub. Date: Jan. 19, 2006

(65) Prior Publication Data

US 2008/0019649 A1    Jan. 24, 2008

(30) Foreign Application Priority Data

Jul. 8, 2004 (KR) .................. 10-2004-0053170

(51) Int. Cl.
G02B 6/36 (2006.01)
G02B 6/02 (2006.01)
G02B 6/28 (2006.01)

(52) U.S. Cl. .................. 385/127; 385/123; 385/124

(58) Field of Classification Search .................. None
See application file for complete search history.

(56) References Cited

U.S. PATENT DOCUMENTS

| | | | |
|---|---|---|---|
| 7,099,543 B2* | 8/2006 | Bickham | 385/123 |
| 2002/0102082 A1* | 8/2002 | Sarchi et al. | 385/123 |
| 2005/0013571 A1* | 1/2005 | Wood | 385/127 |
| 2005/0244120 A1* | 11/2005 | Mishra | 385/127 |

FOREIGN PATENT DOCUMENTS

JP   2002-318315 A   10/2002
KR   2001-0060739 A   7/2001

\* cited by examiner

*Primary Examiner*—Tina M Wong
(74) *Attorney, Agent, or Firm*—Jones Day

(57) ABSTRACT

Disclosed is an optical fiber suitable for WDM system, particularly whose zero-dispersion wavelength is positioned in a short wavelength band less than 1,300 mm. In the optical fiber, dispersion has a positive value, not zero, at 1,310 nm, and a dispersion slope is positive at 1,550 nm with dispersion of 25 ps/nm-km or less. In addition, an effective sectional area is 65 μm² or less at 1,310 nm, and 80 μm² or less at 1,550 nm.

Thus, though a transmission signal is Raman-amplified at a wavelength band of 1,300~1,700 nm, transmission characteristics are not deteriorated due to crosstalk between pump signals. In addition, since the optical fiber has smaller effective sectional area than a general single-mode optical fiber with having substantially the same dispersion feature, it gives better Raman gain efficiency than a general single-mode optical fiber.

14 Claims, 2 Drawing Sheets

OPTICAL FIBER WITH ZERO DISPERSION WAVELENGTH SHIFTED TO SHORT WAVELENGTH REGION, AND OPTICAL TRANSMISSION LINE AND OPTICAL TRANSMISSION SYSTEM USING THE SAME

TECHNICAL FIELD

The present invention relates to an optical fiber suitable for wavelength division multiplexing (WDM) transmission system, particularly to an optical fiber whose zero dispersion wavelength exists at 1,300 nm or less.

BACKGROUND ART

In the case of a wavelength division multiplexing (WDM) transmission system, transmission capacity may be effectively enhanced by increasing a transmission rate, reducing a channel spacing or widening a transmission wavelength range.

Recently, the transmission rate of the system has increased from 2.5 Gb/s to 10 Gb/s, and the transmission system having 40 Gb/s will be generally used in the near future. A power per channel is increased so as to enhance the transmission rate, but noises and non-linearity in optical fibers are increased and then a transmission property is deteriorated if the power per channel is increased as described above.

In the system which is transmitted in a long distance at a transmission rate of 40 Gb/s, the noses may be lowered by using a Raman amplifier instead of a conventional EDFA (Erbium Doped Fiber Amplifier). Also, because tolerance of a signal distortion system by dispersion is proportionate to an inverse square of the transmission rate, the tolerance is decreased to a level of $\frac{1}{16}$ at a receiving end if the transmission rate is increased 4 times. Accordingly, precise dispersion compensation is required so that cumulative dispersion of the transmission channel cannot exceed the tolerance in the system with a transmission rate of 40 Gb/s. For this purpose, RDS (Relative Dispersion Slope) of a dispersion-compensation optical fiber should be similar to RDS of an optical fiber used as a transmission line (wherein, RDS is a value obtained by dividing a dispersion slope by the dispersion).

Also, in order to enhance the transmission capacity, a channel spacing of the system has been narrowed from 200 GHz (1.6 nm) and 100 GHz (0.8 nm) to 50 GHz (0.4 nm) and 25 GHz (0.2 nm) or less. However, as the channel spacing becomes gradually narrowed, signal distortion is caused by a four-wave-mixing phenomenon, or a non-linear phenomenon such as cross phase modulation and XPM (Cross Phase Modulation). Especially, if the low dispersion of the optical fiber is nearly close to the phase-matching condition, cross talk power is caused by a four wave mixing, finally causing a signal distortion.

Intensity of the cross talk power is associated with a power per channel, a channel spacing of the system, and dispersion and effective sectional area of the optical fiber. If the power per channel is reduced to decrease intensity of the cross talk power, an optical signal noise ratio becomes worse, and therefore transmission distance gets short, resulting in an increased cost of the system upon long-distance transmission.

Also, intensity of the cross talk power is lowered as dispersion of the optical fiber increases, but its loss is increased since a length of the used optical fiber for dispersion compensation gets longer in proportion to the dispersion of the optical fiber. Accordingly, the dispersion of the optical fiber should be optimized depending on properties of the system.

Also, an effective sectional area of the optical fiber, which is referred to as light intensity per unit area, is useful to inhibit non-linear phenomenon as the effective sectional area is greater.

As describe above, in addition to accelerate a transmission speed or narrow a channel gap of a transmission wavelength, it is possible to increase transmission capacity by widening an amplifiable wavelength range. In this case, it is required to widen a transmission wavelength range to conventional C band (1,530~1,565 nm) and L band (1,565~1,625 nm), as well as O band (1,260~1,360 nm), E band (1,360~1,460 nm) and S band (1,460~1,530 nm). In this case, it is, however, impossible to use the EDFA (Erbium Doped Fiber Amplifier) to amply signals positioned at the O-E-S bands.

A Raman amplifier rather than EDFA should be used for amplifying signals of a short wavelength range corresponding to the O-E-S bands. Raman amplification, which uses SRS (Stimulated Raman Scattering) phenomenon referred to as a non-linear phenomenon generated in the optical fiber, amplifies signal intensity by converting a power of a pump wavelength into a transmission signal wavelength.

That is to say, if a zero-dispersion wavelength of the optical fiber exists at a pump signal wavelength range, new signals are generated at the transmission signal wavelength range due to crosstalk between the pump signals, resulting in increased noises. Accordingly, the zero-dispersion wavelength of the optical fiber should get out of a range of the pump signal wavelength if the Raman amplification is used. Also, the optical fiber should have a low effective sectional area and a reduced loss so as to improve Raman gain efficiency.

U.S. Pat. No. 5,835,655 discloses an optical fiber in which a zero-dispersion wavelength is shifted to escape from a transmission wavelength range, and an effective sectional area is increased to at least 70 µm$^2$ to prevent a non-linear phenomenon. The optical fiber of the U.S. Pat. No. 5,835,655 may prevent the non-linear phenomenon because it has the effective sectional area of at least 70 µm$^2$, and may inhibit a signal distortion by a four-wave mixing in the C-band because a zero-dispersion wavelength is located in a wavelength range of 1,500~1,540 nm or 1,560~1,600 nm. However, described was not the patent the optical fiber whose zero-dispersion wavelength exists on 1,300 nm or less to use O-E-S bands as the transmission line, and effective sectional area is suitably adjusted to inhibit the non-linear phenomenon and also enable the Raman amplification.

Also, U.S. Pat. No. 6,396,987 discloses an optical fiber capable of reducing a cost for the dispersion compensation, compared to general single mode optical fibers in a system having a transmission rate of 40 Gb/s. That is to say, the optical fiber of the U.S. Pat. No. 6,396,987 has dispersion of 6~10 ps/nm-km, a dispersion slope of 0.07 ps/nm$^2$-km or less, and an effective sectional area of at least 60 µm$^2$ at a 1,550 nm. In this case, the optical fiber has a problem that the signal distortion by the four-wave mixing arises in a pump wavelength range because the zero-dispersion wavelength is located near 1,460 nm, for example near a pump wavelength for Raman amplification.

DISCLOSURE OF INVENTION

The present invention is designed to solve the problems of the prior art, and therefore it is an object of the present invention to provide an optical fiber which enables wavelength division multiflexing (WDM) transmission at a wide wavelength range of 1,300 to 1,700 nm. In particular, the present invention provides an optical fiber whose zero-dispersion wavelength is shifted to a short wavelength range to enable Raman amplification at a wide wavelength range of 1,300 to 1,700 nm.

Also, it is another object of the present invention to provide an optical fiber whose non-linear phenomenon such as a four-wave-mixing is inhibited at the transmission wavelength range to the maximum extent to enable a signal transmission in a short wavelength range (O-E-S bands) of 1,530 nm or less. Especially, the present invention provides an effective sectional area of the optical fiber capable of inhibiting the non-linear phenomenon to the maximum extent and also improving Raman gain efficiency at the transmission wavelength range.

Also, it is still another object of the present invention to provide an optical transmission line using the above-mentioned optical fiber, and an optical communication system adopting the optical transmission line.

These and other objects and advantages of the present invention will be described in detail, as follows. Also, these and other objects and advantages of the present invention will be realized by means and combinations as described in accompanying claims.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Figure 1:
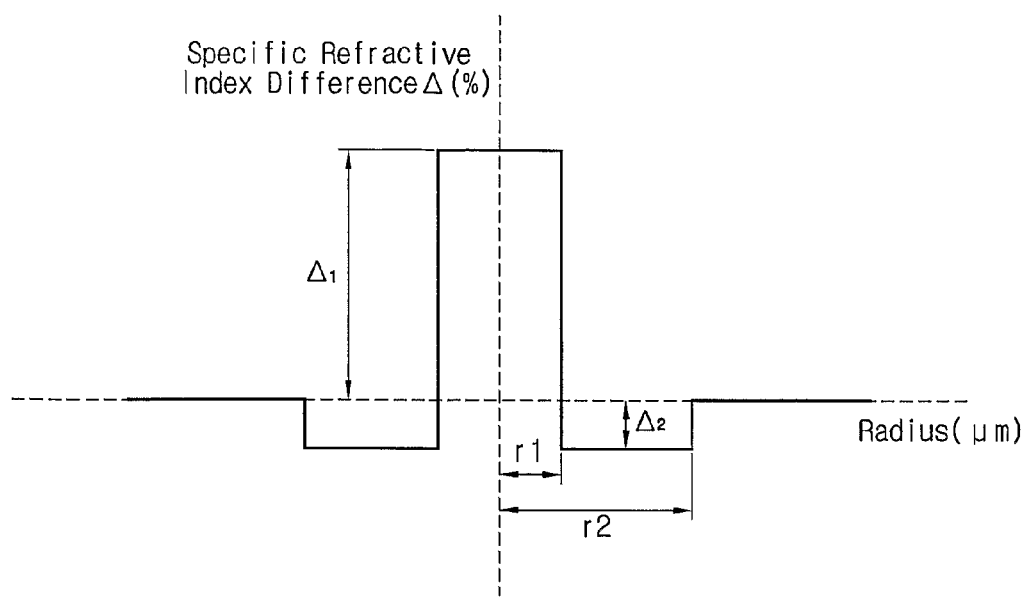
FIG. 1 is a diagram showing a refractive index profile of an optical fiber according to the present invention.

The optical fiber of the present invention may transmit optical signals through an O band (1,260~1,360 nm), an E band (1,360~1,460 nm) and an S band (1,460~1,530 nm), as well as a conventional C-band (1,530~1,565 nm) and a conventional L-band (1,565~1,625 nm) without signal distortion. In particular, a Raman amplifier is used to amplify the optical signals transmitted in the transmission wavelength range.

The Raman amplification relates to a method for amplifying a transmission signal power using SRS (Stimulated Raman Scattering) which is referred to as a non-linear phenomenon of the optical fiber, and the transmission signal power is transmitted from a pump signal to a transmission signal by SRS. A Raman amplification gain spectrum may be flattened by a plurality of the pumps if it has a wide transmission wavelength range. At this time, if the zero-dispersion wavelength of the optical fiber is positioned between wavelength ranges of the pump signal and the transmission signal, an optical signal noise ratio is increased and transmission properties are deteriorated due to cross talk between a plurality of the pump signals, and cross talk between a noise signal generated by the cross talk and a transmission signal. Accordingly, in the optical fiber used in the system adopting the Raman amplifier, its zero-dispersion wavelength should be lower than that of a pump signal wavelength. Particularly, the zero-dispersion wavelength of the optical fiber should be shifted below 1,300 nm if Raman-amplified optical signals are transmitted through not only the C-band or the L-band but also the O-band, the E-band and the S-band. That is to say, the zero-dispersion wavelength of the optical fiber according to the present invention exists on 1,300 nm or less.

The optical fiber of the present invention has a positive dispersion value, not zero, at 1,310 nm, and a positive dispersion slope at 1,550 nm with dispersion of 25 ps/nm-km or less. Also, a cut-off wavelength should exist at a shorter wavelength range than the zero-dispersion wavelength since the optical fiber may be operated as a single mode.

Also, a dispersion value and an effective sectional area should be large enough to inhibit a non-linear phenomenon such as FWM at a transmission wavelength band, and an effective sectional area should be reduced to improve Raman gain efficiency by means of the Raman amplification. Accordingly, in the optical fiber of the present invention the effective sectional area was optimized to improve the Raman gain efficiency at 1,300~1,700 nm without signal distortion by the non-linear phenomenon.

That is to say, the optical fiber of the present invention should have an effective sectional area of 65 $\mu m^2$ or less (more preferably, 60 $\mu m^2$ or less) at 1,310 nm, an effective sectional area of 80 $\mu m^2$ or less (more preferably, 70 $\mu m^2$ or less) at 1,550 nm, and an effective sectional area of al least 35 $\mu m^2$ at 1,300~1,500 nm.

Also in the optical fiber of the present invention, a loss at 1,385 nm was set to a lower value than a loss at 1,310 nm so as to realize a low-loss transmission at E band, especially at 1,385 nm. For this purpose, an additional dehydration process was used to lower concentration of hydroxyl group of the optical fiber below 0.8 ppb. The process for manufacturing such an OH-free single mode optical fiber is described in U.S. Pat. Nos. 3,737,292, 3,823,995, 3,884,550, 4,737,179 and 6,131,415, and Japanese Patent Japanese Patent Application No. Sho 63-315530.

The optical fiber according to the present invention preferably has a W-type refractive index profile as shown in FIG. 1.

As shown in FIG. 1, the optical fiber according to the present invention includes a first core region having a radius ($r_1$) from the optically central axis and a specific refractive index difference ($\Delta_1$); a second core region surrounding the first core region and having a radius ($r_2$) from the optically central axis and a specific refractive index difference ($\Delta_2$); and a clad region surrounding the second core region and having a radius ($r_3$) from the optically central axis and a specific refractive index difference ($\Delta_3$).

That is to say, the optical fiber of the present invention has the W-type refractive index profile where each radius of the region is $r_1 < r_2 < r_3$, and the specific refractive index difference is $\Delta_1 > \Delta_3 > \Delta_2$, and $\Delta_2 < 0$ (wherein, $\Delta_1(\%) = [(n_1 - n_c)/n_c] \times 100$, $\Delta_2(\%) = [(n_2 - n_c)/n_c] \times 100$, $n_1$: a refractive index of the first core region, $n_2$: a refractive index of the second core region, $n_c$: a refractive index of the clad region).

Also, the optical properties of the optical fiber (the zero-dispersion wavelength, dispersion, the dispersion slope, etc.) are realized by adjusting a refractive index distribution that is a change of a refractive index in a radial direction of the optical fiber. Accordingly, an optimized operation of the refractive index distribution is carried out to give a refractive index distribution having a lowest difference from a desired value of the optical property, as shown in FIG. 2.

Figure 2:
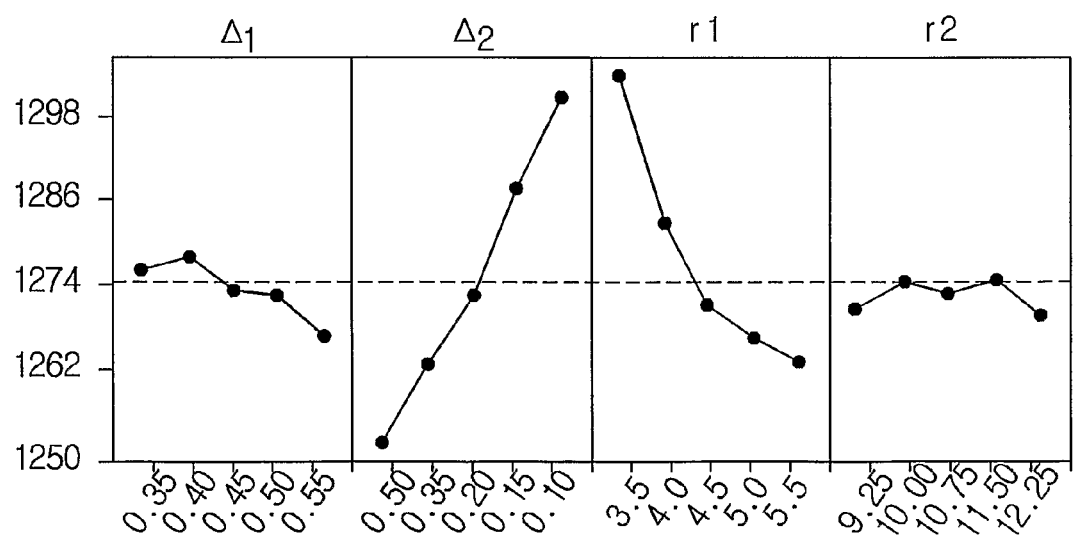
FIG. 2 is a graph showing changes of a zero-dispersion wavelength according to a refractive index distribution of the optical fiber.

FIG. 2 shows a graph for changes of a zero-dispersion wavelength according to a specific refractive index difference (Δ) and a radius (r) in the optical fiber having a W-type refractive index distribution. FIG. 2 shows the changes of the zero-dispersion wavelength when the specific refractive index difference ($\Delta_1$) is changed in a range of 0.4~0.5%, the specific refractive index difference ($\Delta_2$) in a range of −0.05~−0.35%, the radius ($r_1$) in a range of 4.0~5.0 μm, and the radius ($r_2$) in a range of 10.0~11.5 μm.

As shown in FIG. 2, it is revealed that the zero-dispersion wavelength of the optical fiber according to the present invention is mainly changed by the specific refractive index difference ($\Delta_2$) and the radius ($r_1$), and the zero-dispersion wavelength is shifted to a short wavelength band as the absolute value of the specific refractive index difference ($\Delta_2$) and the radius ($r_1$) are greater.

A preferred refractive index distribution of the optical fiber whose zero-dispersion wavelength exists at 1,300 nm or less and whose above-mentioned dispersion values (1,310 nm: not zero, 1,550 nm: 25 ps/nm-km or less) and effective sectional areas (1,310 nm: 65 μm² or less, 1550 nm: 80 μm² or less) are satisfied is calculated, as follows.

That is to say, in the optical fiber of one embodiment of the present invention, the first core region preferably has the radius ($r_1$) of 3.9±0.6 μm, and the specific refractive index difference [$\Delta_1(\%)$] of 0.55±0.04%; and the second core region preferably has the radius ($r_2$) of 12.3±0.6 μm, and the specific refractive index difference ($\Delta_2$) of −0.37±0.04%.

Also, in the optical fiber of another embodiment of the present invention, the first core region preferably has the radius ($r_1$) of 4.3±0.6 μm, and the specific refractive index difference ($\Delta_1$) of 0.42±0.04%; and the second core region preferably has the radius ($r_2$) of 10.3±0.6 μm, and the specific refractive index difference ($\Delta_2$) of −0.07±0.04%.

One embodiment of the present invention relates to an optical transmission line using the above-mentioned optical fiber, and an optical communication system adopting the optical transmission line as at least a part of the optical transmission line.

EXAMPLE 1

(1) Radius: $r_1$=4.3 μm, $r_2$=10.3 μm
(2) Specific refractive index difference: $\Delta_1(\%)$=0.42%, $\Delta_2$=−0.07%
(3) Zero-dispersion wavelength: 1,289 nm
(4) Dispersion
1,460 nm:13.0 ps/nm-km, 1,530 nm:17.3 ps/nm-km, 1,550 nm:18.4 ps/nm-km, 1,625 nm:22.5 ps/nm-km
(5) Effective sectional area
1,460 nm:62 μm², 1,550 nm:66 μm², 1,625 nm:69 μm²
(6) Cut-off wavelength: 1,250 nm

EXAMPLE 2

(1) Radius: $r_1$=3.9 μm, $r_2$=12.3 μm
(2) Specific refractive index difference: $\Delta_1(\%)$=0.55%, $\Delta_2$=−0.37%
(3) Zero-dispersion wavelength: 1,264 nm
(4) Dispersion
1,460 nm:15.5 ps/nm-km, 1,530 nm:19.8 ps/nm-km, 1,550 nm:20.9 ps/nm-km, 1,625 nm:24.9 ps/nm-km
(5) Effective sectional area
1,460 nm:42 μm², 1,550 nm:44 μm², 1,625 nm:45 μm²
(6) Cut-off wavelength: 1,200 nm In the Examples 1 and 2, the radius and the specific refractive index difference may have a manufacturing tolerance of ±∝ (for example, about ±0.6 μm for the radius, and about ±0.04% for the specific refractive index difference).

Figure 3:
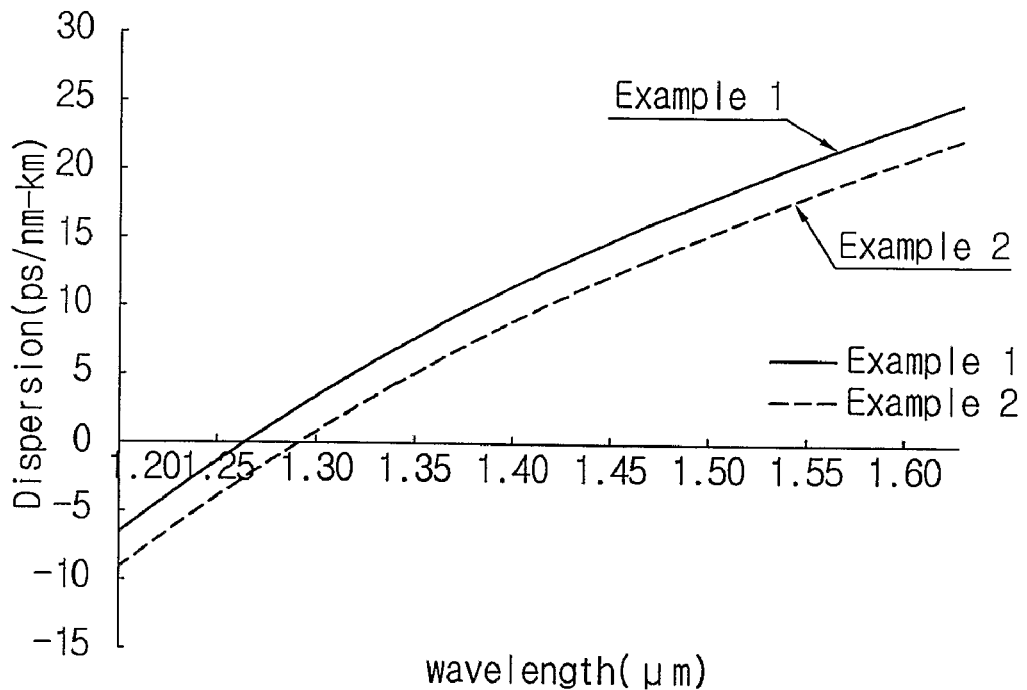
FIG. 3 is a graph showing a dispersion property for each wavelength of optical fibers according to embodiments of the present invention.

FIG. 3 shows transmission properties for each wavelength of the optical fibers corresponding to the Examples 1 and 2. The optical fibers corresponding to the Examples 1 and 2 have dispersions of 13~25 ps/nm-km at 1,460 nm~1,625 nm and positive dispersion slopes.

Figure 4:
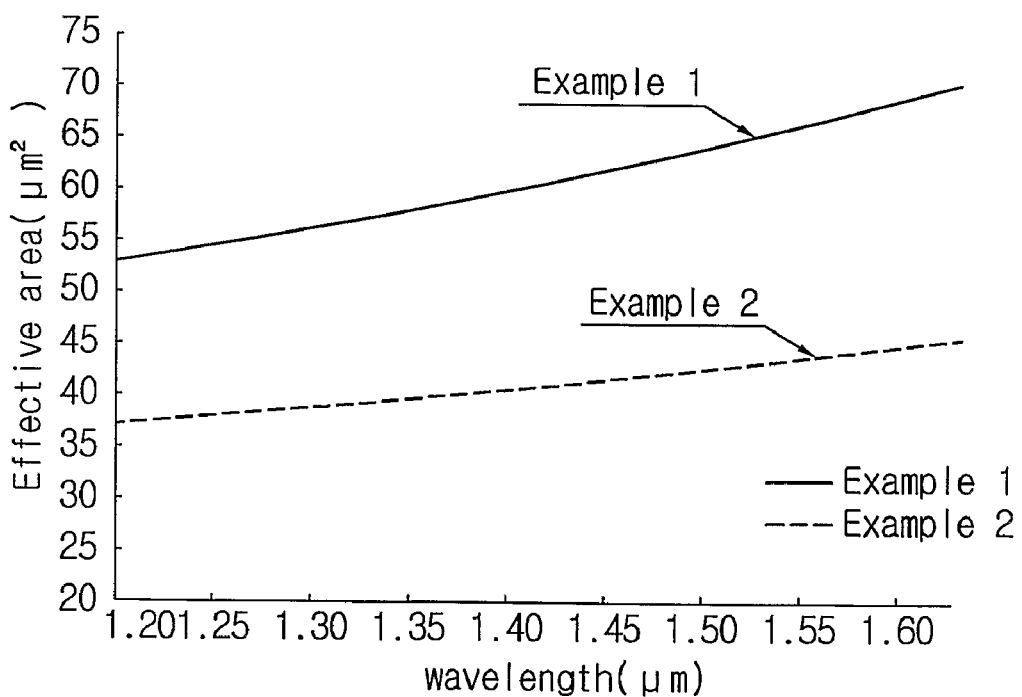
FIG. 4 is a graph showing an effective sectional area for each wavelength of an optical fiber according to embodiments of the present invention.

Also, FIG. 4 shows properties of the effective sectional area for each wavelength of the optical fibers corresponding to the Examples 1 and 2. The optical fibers corresponding to the Examples 1 and 2 have effective sectional areas of 42 μm²~62 μm² at 1,460 nm and 44~65 μm² at 1,550 nm, and also the effective sectional areas of at least 45~69 μm² at 1,625 nm.

As described above, the optical fibers corresponding to the Examples 1 and 2 may transmit the signals at 1,300~1,700 nm without crosstalk or signal distortion because their zero-dispersion wavelengths exist at 1,300 mm or less and their dispersion have the positive values, not zero, and the effective sectional areas of 80 μm² or less at a longer wavelength range than 1,310 nm.

It should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

Accordingly, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

The zero-dispersion wavelength of the optical fiber according to the present invention exists at 1,300 nm or less. Accordingly, the transmission property of the optical fiber is not deteriorated by the crosstalk between the pump signals even though the transmission signals are Raman-amplified at 1,300~1,700 nm. Also, the optical fiber of the present invention is operated as a single mode at 1,300 nm or less since its cut-off wavelength exists at 1,300 nm or less, and has a higher Raman gain efficiency than conventional single mode optical fibers since it has the similar dispersion property to the conventional single mode optical fibers and the low effective sectional area.

In addition, the optical fiber of the present invention enables the wavelength division multiflexing transmission at a wavelength range of 1,300 to 1,700 nm with a low loss without signal distortion.

What is claimed is:

1. A single mode optical fiber for enabling wavelength division multiflexing transmission at a wavelength range of 1,300 to 1,700 nm, the optical fiber having:
   (a) a positive dispersion value, not zero, at 1,310 nm, and a positive dispersion slope at 1,550 nm with dispersion of 25 ps/nm-km or less; and
   (b) an effective sectional area of 65 μm² or less at 1,310 nm, and 80 μm² or less at 1,550 nm.

2. The single mode optical fiber according to the claim 1, wherein the effective sectional area at a wavelength range of 1,300 to 1,500 nm is at least 35 μm².

3. The single mode optical fiber according to the claim 1, wherein the single mode optical fiber is adopted in a wavelength division multiplexing transmission system using a Raman amplifier at a wavelength range of 1,300 to 1,500 nm.

4. The single mode optical fiber according to the claim 1, wherein the effective sectional area at 1,550 nm is 70 $\mu m^2$ or less.

5. The single mode optical fiber according to the claim 1, wherein a loss at 1,385 nm is lower than a loss at 1,310 nm.

6. A single mode optical fiber for enabling wavelength division multiplexing transmission at a wavelength range of 1,300 to 1,700 nm, the optical fiber having:
 (a) a first core region positioned in an optically central axis and having a radius ($r_1$) from the optically central axis and a specific refractive index difference ($\Delta_1$);
 (b) a second core region surrounding the first core region and having a radius ($r_2$) from the optically central axis and a specific refractive index difference ($\Delta_2$);
 (c) a clad region surrounding the second core region and having a radius ($r_3$) from the optically central axis and a specific refractive index difference ($\Delta_3$); and
 the optical fiber also having:
 (d) a W-type refractive index profile where each radius of the region is $r_1<r_2<r_3$, and the specific refractive index difference is $\Delta_1>\Delta_3>\Delta_2$, and $\Delta_2<0$;
 (wherein, $\Delta_1(\%)=[(n_1-n_c)/n_c]\times 100$, $\Delta_2(\%)=[(n_2-n_c)/n_c]\times 100$, $n_1$: a refractive index of the first core region, $n_2$: a refractive index of the second core region, $n_c$: a refractive index of the clad region)
 (e) a positive dispersion value, not zero, at 1,310 nm, and a positive dispersion slope at 1,550 nm with dispersion of 25 ps/nm-km or less; and
 (f) an effective sectional area of 65 $\mu m^2$ or less at 1,310 nm, and 80 $\mu m^2$ or less at 1,550 nm.

7. The single mode optical fiber according to the claim 6, wherein the single mode optical fiber is adopted in a wavelength division multiplexing transmission system using a Raman amplifier at a wavelength range of 1,300 to 1,500 nm.

8. The single mode optical fiber according to the claim 6, wherein the effective sectional area at 1,550 nm is 70 $\mu m^2$ or less.

9. The single mode optical fiber according to the claim 6, wherein the effective sectional area at 1,310 nm is 60 $\mu m^2$ or less.

10. The single mode optical fiber according to the claim 6, wherein a loss at 1,385 nm is lower than a loss at 1,310 nm.

11. The single mode optical fiber according to the claim 6,
 i) wherein the first core region has the radius ($r_1$) of 3.9±0.6 µm, and the specific refractive index difference ($\Delta_1(\%)$) of 0.55±0.04%; and
 ii) wherein the second core region has the radius ($r_2$) of 12.3±0.6 µm, and the specific refractive index difference ($\Delta_2$) of −0.37±0.04%.

12. The single mode optical fiber according to the claim 6,
 i) wherein the first core region has the radius ($r_1$) of 4.3±10.6 µm, and the specific refractive index difference ($\Delta_1(\%)$) of 0.42±0.04%; and
 ii) wherein the second core region has the radius ($r_2$) of 10.3±0.6 µm, and the specific refractive index difference ($\Delta_2$) of −0.07±0.04%.

13. An optical transmission line employing the single mode optical fiber defined in the claim 1 or 6.

14. An optical communication system employing the optical transmission line defined in the claim 13 as at least a part of the optical transmission line.

* * * * *